United States Patent
Khemani et al.

(10) Patent No.: US 10,642,704 B2
(45) Date of Patent: *May 5, 2020

(54) STORAGE CONTROLLER FAILOVER SYSTEM

(71) Applicant: Dell Products L.P., Round Rock, TX (US)

(72) Inventors: Lucky Pratap Khemani, Bangalore (IN); Kala Sampathkumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 177 days.

This patent is subject to a terminal disclaimer.

(21) Appl. No.: 15/841,083

(22) Filed: Dec. 13, 2017

(65) Prior Publication Data

US 2018/0107572 A1 Apr. 19, 2018

Related U.S. Application Data

(63) Continuation of application No. 15/048,795, filed on Feb. 19, 2016, now Pat. No. 9,864,663.

(51) Int. Cl.
*G06F 11/00* (2006.01)
*G06F 11/20* (2006.01)
(Continued)

(52) U.S. Cl.
CPC ...... *G06F 11/2094* (2013.01); *G06F 11/2092* (2013.01); *G06F 11/2097* (2013.01);
(Continued)

(58) Field of Classification Search
CPC ............ G06F 11/2094; G06F 11/2092; G06F 11/2097; G06F 11/2089; G06F 11/2071;
(Continued)

(56) References Cited

U.S. PATENT DOCUMENTS 7,409,508 B2 8/2008 Mizuno et al.
7,761,680 B2 * 7/2010 Ash .................. G06F 11/2033
711/120

(Continued)

OTHER PUBLICATIONS

Mrnutcracker, "Dell Dual Raid Controllers—Spiceworks," Jan. 24, 2014, pp. 1-2, http://community.spiceworks.com/topic/435859-dell-dual-raid-controllers.

(Continued)

*Primary Examiner* — Marc Duncan
(74) *Attorney, Agent, or Firm* — Haynes and Boone, LLP

(57) ABSTRACT

A storage controller failover system includes servers, storage controllers coupled to storage subsystems, and a switching system coupling the servers to the storage controllers. A storage controller configurations and storage controller caches for each of the storage controllers are stored in one or more database. A failure is detected of a first storage controller that has provided first storage communications along a first path between a first server and a first storage subsystem and, in response, a second storage controller that is configured to take over the first storage communications from the first storage controller is determined based on its second storage controller configuration. A first storage controller cache for the first storage controller is provided to the second storage controller, and the second storage controller is caused to provide the first storage communications along a second path between the first server and the first storage subsystem.

18 Claims, 12 Drawing Sheets

(51) Int. Cl.
*G06F 12/0893* (2016.01)
*G06F 16/22* (2019.01)
(52) U.S. Cl.
CPC .......... *G06F 12/0893* (2013.01); *G06F 16/22* (2019.01); *G06F 2201/85* (2013.01); *G06F 2212/604* (2013.01)
(58) Field of Classification Search
CPC .............. G06F 11/2069; G06F 11/2005; G06F 11/2023; G06F 11/203; G06F 11/2046; G06F 11/2025; G06F 16/22; G06F 12/0893; G06F 12/0802; G06F 2201/85; G06F 2212/604
See application file for complete search history.

(56) References Cited

U.S. PATENT DOCUMENTS

| | | | |
|---|---|---|---|
| 7,836,157 B2 | 11/2010 | Komaki | |
| 8,688,838 B2 | 4/2014 | Darling et al. | |
| 8,689,044 B2 | 4/2014 | Natrajan et al. | |
| 8,938,574 B2 * | 1/2015 | Smith | G06F 11/2089 711/103 |
| 9,239,797 B2 | 1/2016 | Galbraith et al. | |
| 9,348,714 B2 | 5/2016 | Jain et al. | |
| 9,864,663 B2 * | 1/2018 | Khemani | G06F 11/2094 |
| 2007/0288792 A1 | 12/2007 | Thorpe et al. | |
| 2007/0294564 A1 * | 12/2007 | Reddin | G06F 11/2092 714/6.12 |
| 2012/0102268 A1 | 4/2012 | Smith et al. | |
| 2013/0132766 A1 | 5/2013 | Bhatia et al. | |
| 2014/0244936 A1 | 8/2014 | Maharana et al. | |
| 2015/0363319 A1 * | 12/2015 | Qi | G06F 3/0619 711/121 |
| 2016/0342437 A1 | 11/2016 | Khemani et al. | |
| 2017/0242771 A1 | 8/2017 | Khemani et al. | |

OTHER PUBLICATIONS

"Syncro 9361-8i; Bring a Dense, Cost-Effective High Availability (HA) Cluster-In-A-Box (CIB) Solution to Your Enterprise Datacenter," 2005-2006, pp. 1-2, Avago Technologies, http://www.avagotech.com/products/server-storage/shared-das/syncro-9361-81.

* cited by examiner

| SERVER ID 404 | STORAGE CONTROLLER ID 406 | VIRTUAL DISK INFO 408 | PHYSICAL DISK INFO 410 | STORAGE CONTORLLER TYPE 412 | ACTIVE VIRTUAL FUNCTIONS 414 | RESERVED VIRTUAL FUNCTIONS 416 |
|---|---|---|---|---|---|---|
| SERVER 204a | STORAGE CONTROLLER 208b | RAID SUBSYSTEM 214 | STORAGE DEVICES 214a | SHARED | ACTIVE VFs 604a | RESERVED VFs 604b |
| SERVER 204e | STORAGE CONTROLLER 208f | RAID SUBSYSTEMS 214, 218 | STORAGE DEVICES 214a, 218a | SHARED | ACTIVE VFs 606a | RESERVED VFs 606b |

STORAGE CONTROLLER DATABASE 400

FIG. 6b

STORAGE CONTROLLER FAILOVER SYSTEM

CROSS-REFERENCE TO RELATED APPLICATIONS

This is a Continuation application to U.S. Utility application Ser. No. 15/048,795 filed Feb. 19, 2016, entitled "STORAGE CONTROLLER FAILOVER SYSTEM," the disclosure of which is incorporated herein by reference in its entirety.

BACKGROUND

The present disclosure relates generally to information handling systems, and more particularly to providing failover for storage controllers used with information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems include storage systems such as, for example, Redundant Array of Independent Disk (RAID) storage systems. For example, such information handling systems may include servers that access storage devices in the RAID storage system via storage controllers, and in many embodiments, more than one storage controller is utilized by the servers to access those storage devices. It is desirable to provide for failover of those storage controllers in the event that they fail or otherwise become unavailable. Conventional systems for providing for failover of storage controllers includes the provisioning of a secondary storage controller along with a primary storage controller, and having an administrator manually configure the secondary storage controller to take over storage controller functions when the primary storage controller fails or otherwise becomes unavailable to the server using it. In such systems, the secondary storage controller is "redundant" and "passive" relative to the "active" primary storage controller (sometimes referred to as an "active/passive" failover system) in that the secondary storage controller does not perform any functions for the information handling system. As such, dealing with a failure of a primary storage controller is a manual, time-consuming process, while secondary storage controllers in some conventional systems may never actually be used (i.e., in the case where the primary storage controller never fails or otherwise becomes unavailable), resulting in wasted hardware and expenditures for the "insurance" storage controllers that were not needed.

Accordingly, it would be desirable to provide an improved storage controller failover system.

SUMMARY

According to one embodiment, an information handling system (IHS) includes a switching system that is configured to couple a plurality of servers to a plurality of storage controllers, wherein the switching system is configured to enable the storage of a respective storage controller cache for each of the plurality of storage controllers in a cache database; and a controller system that is coupled to the switching system and configured to couple to the plurality of servers, wherein the controller system: stores a respective storage controller configuration for each of the plurality of storage controllers in a storage controller database; determines that a first storage controller of the plurality of storage controllers that has provided first storage communications along a first path between a first server of the plurality of servers and a first storage subsystem of the plurality of storage subsystems has failed and, in response, determines a second storage controller of the plurality of storage controllers that is configured to take over the first storage communications from the first storage controller based on a second storage controller configuration for the second storage controller that is stored in the storage controller database; provides a first storage controller cache for the first storage controller that is stored in the cache database to the second storage controller; and causes the second storage controller to provide the first storage communications along a second path between the first server and the first storage subsystem.

BRIEF DESCRIPTION OF THE DRAWINGS

FIG. 6b is a schematic view illustrating an embodiment of the storage controller database of FIG. 4 in the storage controller failover system of FIG. 6a.

FIG. 7b is a schematic view illustrating an embodiment of the storage controller database of FIG. 4 in the storage controller failover system of FIG. 7a.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
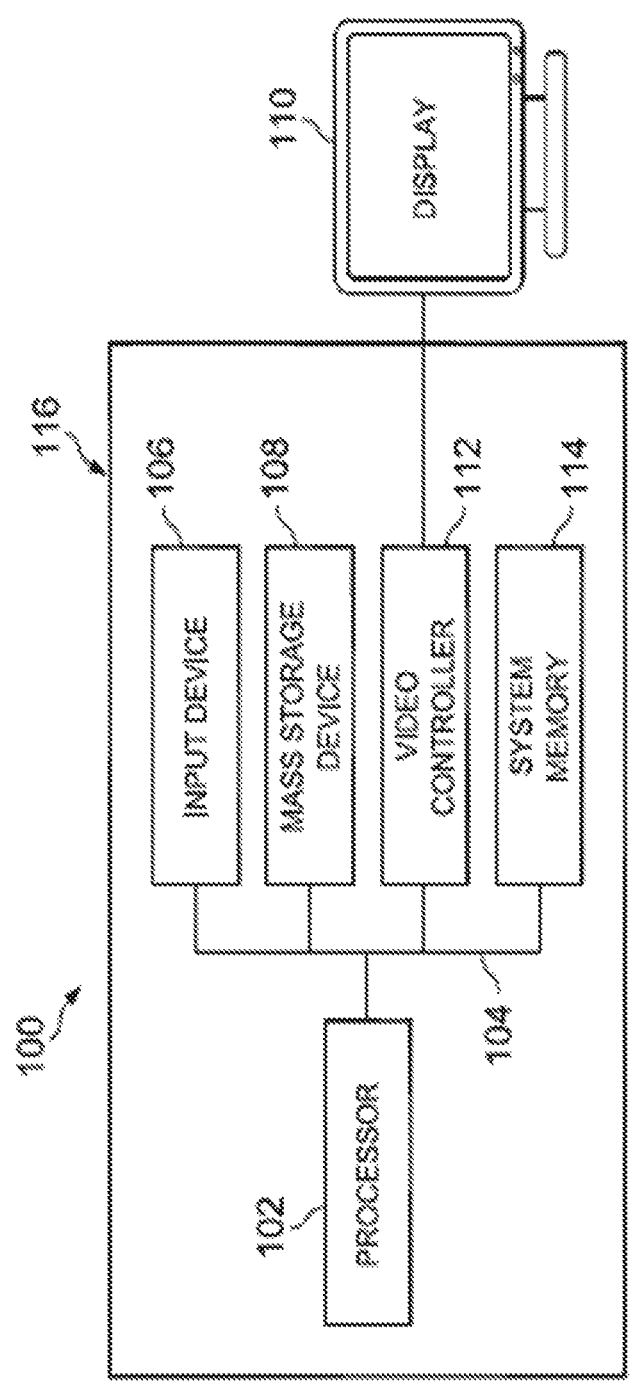
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
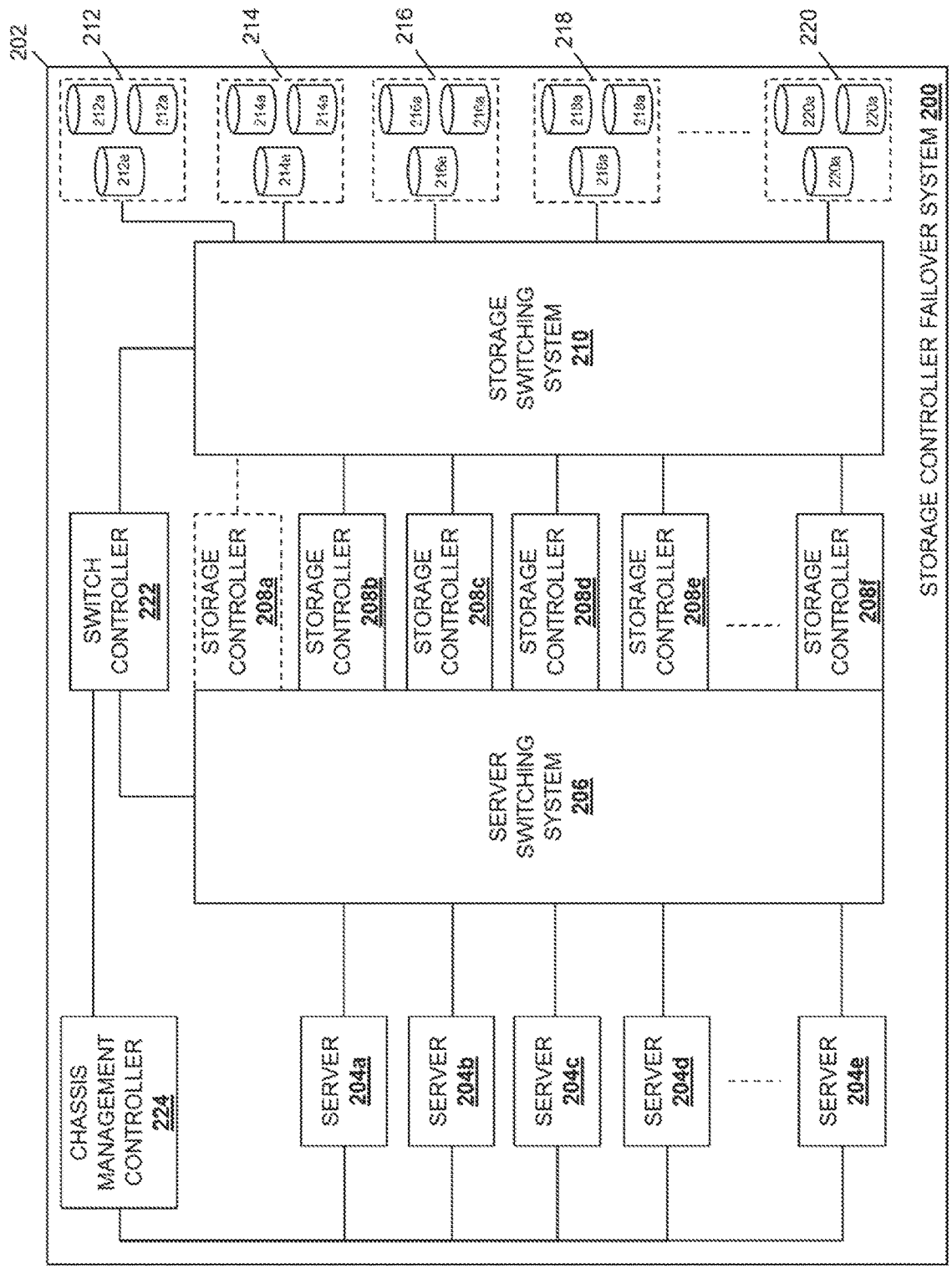
FIG. 2 is a schematic view illustrating an embodiment of a storage controller failover system.

Referring now to FIG. 2, an embodiment of a storage controller failover system 200 is illustrated. In an embodiment, the storage controller failover system 200 may be the IHS discussed above with reference to FIG. 1 and/or may include some or all of the components of the IHS 100. In a specific example, the storage controller failover system 200 may be provided by a POWEREDGE® VRTX system, available from DELL® Inc. of Round Rock, Tex., United States, that provides a mini-blade chassis with a built-in storage system, although other systems will benefit from the teachings of the present disclosure and thus will fall within its scope. The storage controller failover system 200 includes a chassis 202 that houses the components of the storage controller failover system 200, only some of which are illustrated in FIG. 2. For example, in the illustrated embodiment, the chassis 202 houses a plurality of servers 204a, 204b, 204c, 204d, and up to 204e, each of which may be coupled to the chassis 202 via mounting features provided on the servers 204a-e and the chassis 202. In an embodiment any or all of the servers 204a-e may be the IHS discussed above with reference to FIG. 1 and/or may include some or all of the components of the IHS 100. In a specific embodiment, the servers 204a-e are blade servers, although other servers and/or computing devices are envisioned as falling within the scope of the present disclosure. The servers 204a-e may include or be coupled to one or more remote access controllers (e.g., a DELL® remote access controller (iDRAC) available from DELL® Inc. of Round Rock, Tex., United States) that is configured to provide out-of-band management facilities.

The chassis 202 also houses a server switching system 206 that is coupled to the servers 204a-e (e.g., via communication bridge(s) provided in the server switching system 206). In an embodiment, the server switching system 206 may include a multi-root input/output virtualization (MR-IOV) Peripheral Component Interconnect express (PCIe) switch that may be provided on a circuit board such as, for example, a chassis mid-plane, although other forms of the server switching system 206 are envisioned as falling within the scope of the present disclosure. As discussed below, in some embodiments, the remote access controller(s) included in or coupled to the servers 204a-e may be provided a PCIe Vendor Defined Message (VDM) channel to the server switching system 206 that provides a secondary communications channel (e.g., for I/O traffic) for the servers 204a-e. The chassis 202 also houses a plurality of a storage controllers 208a, 208b, 208c, 208d, 208e, and up to 208f, each of which is coupled to the server switching system 206 (e.g., via communication bridge(s) provided in the server switching system 206). In an embodiment, any or all of the storage controllers 208a-f may be the IHS discussed above with reference to FIG. 1 and/or may include some or all of the components of the IHS 100. In particular, each of the storage controllers 208a-f, in addition to including a variety of storage controller hardware and software for enabling storage controller functionality known in the art, also include memory/storage devices that store a storage controller cache that is utilized by that storage controller in performing the storage controller functionality. In a specific example, the storage controllers 208a-f may be provided by POWEREDGE® Redundant Array of Independent Disk (RAID) controllers (PERCs) available from DELL® Inc. of Round Rock, Tex., United States, although other storage controllers are envisioned as falling within the scope of the present disclosure. In the illustrated embodiment, the storage controller 208a is provided with a dashed line to indicate that it may be provided as an optional redundant storage controller (discussed in further detail below), or may be omitted from the storage controller failover system 200 in other embodiments. In the different embodiments discussed below, the storage controllers 208a-f may include storage controllers dedicated for a particular server 204a-e, "chassis" storage controllers shared by any of the servers 204a-e, and/or provided for other storage controller uses known in the art.

The chassis 202 also houses a storage switching system 210 that is coupled to each of the storage controllers 208a-f (e.g., via communication bridge(s) provided in the storage switching system 210). In an embodiment, the storage switching system 210 may include a Serial Attached Small Computer System Interface (SCSI) (SAS) switch, although other forms of the storage switching system 210 are envisioned as falling within the scope of the present disclosure. The chassis 202 also houses a storage system that, in the embodiments discussed below, is a RAID system including a plurality of storage subsystems that are discussed below as being RAID subsystems 212, 214, 216, 218, and up to 220 that each include one or more storage devices 212*a*, 214*a*, 216, 218*a*, and 220, respectively, each of which is coupled to the storage switching system 210 (e.g., via a communication bridge provided in the storage switching system 210). However, other storage systems and subsystems will benefit from the teachings of the present disclosure and thus are envisioned as falling within its scope.

The chassis 202 also houses a switch controller 222 that is coupled to each of the server switching system 206 and the storage switching system 210. In an embodiment, the switch controller 222 may be provided by a microcontroller unit (MCU) that is configured to perform the PCIe and SAS switch management discussed below, although other controllers will fall within the scope of the present disclosure as well. The chassis 202 also houses a chassis management controller (CMC) 224 that is coupled to each of the servers 204*a-e* and the switch controller 222. While a specific embodiment of a storage controller failover system 200 has been illustrated and described, one of skill in the art in possession of the present disclosure will recognize that a wide variety of modification to the storage controller failover system 200 will fall within the scope of the present disclosure, including combing components, modifying components, adding components, removing components, and/or distributing components across different chassis.

Figure 3:
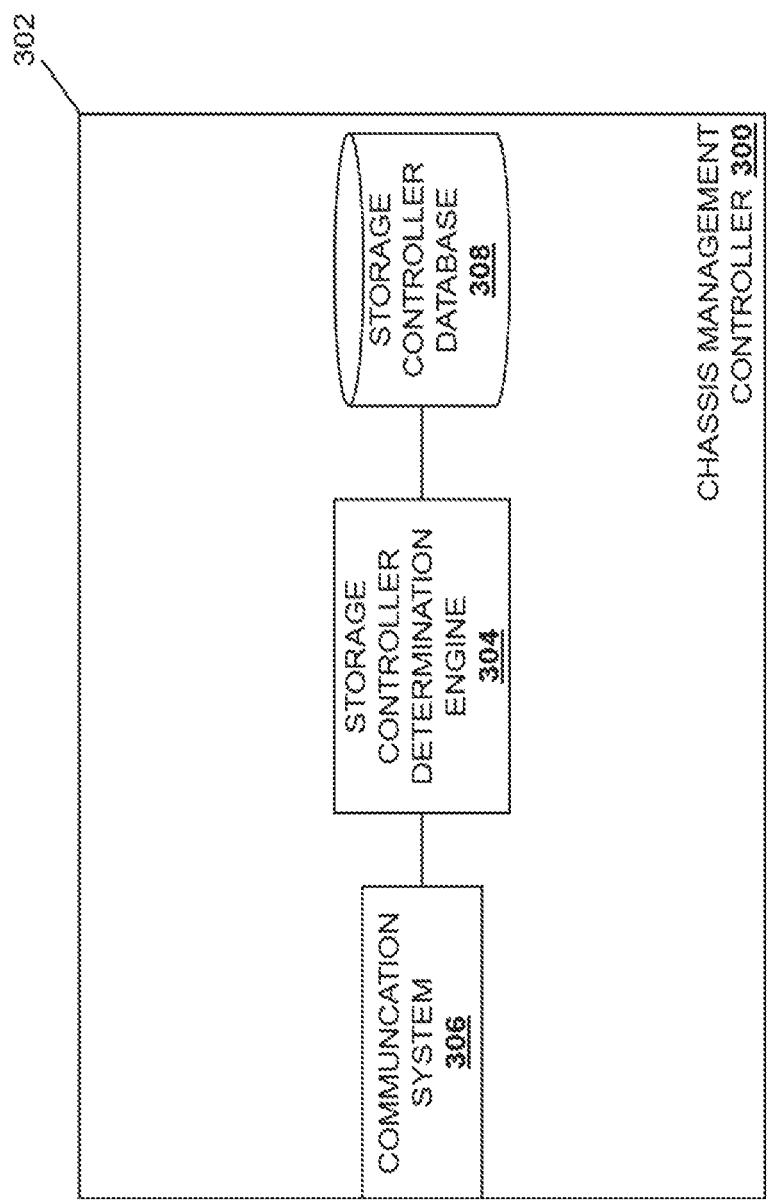
FIG. 3 is a schematic view illustrating an embodiment of a chassis management controller used in the storage controller failover system of FIG. 2.

Referring now to FIG. 3, an embodiment of a chassis management controller 300 is illustrated that may be the chassis management controller 224 discussed above with reference to FIG. 2. The chassis management controller 300 may include a chassis 302 that houses or supports the components of the chassis management controller 300, only some of which are illustrated in FIG. 3. However, in other embodiments, the components of the chassis management controller 300 may be distributed outside of a single chassis or across multiple chassis. The components of the chassis management controller 300 may include a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a storage controller determination engine 304 that is configured to perform the functions of the storage controller determination engines and chassis management controllers discussed below including the intelligent selection of storage controllers in response to a storage controller failure that is performed according to the method 500.

The chassis management controller 300 also includes a communication system 306 that is coupled to the storage controller determination engine 304 (e.g., via a coupling between the communication system 306 and the processing system) and that may provide any connections between the chassis management controller 224/300 and the servers 204*a-e* and switch controller 222 that allow for the communications discussed below. The chassis management controller 300 also may include a storage device (not illustrated, but which may be the storage device 108 discussed above with reference to FIG. 1) that is coupled to the storage controller determination engine 304 (e.g., via a coupling between the storage device and the processing system) and that includes a storage controller database 308 that is configured to store information about the storage controllers 208*a-f* as discussed in further detail below. While a specific embodiment of a chassis management controller 300 has been illustrated and described, one of skill in the art in possession of the present disclosure will recognize that a wide variety of modification to the chassis management controller 300 that allows the chassis management controller 300 to perform the functionality discussed below, as well as conventional functionality known in the art, will fall within the scope of the present disclosure.

Figure 4:
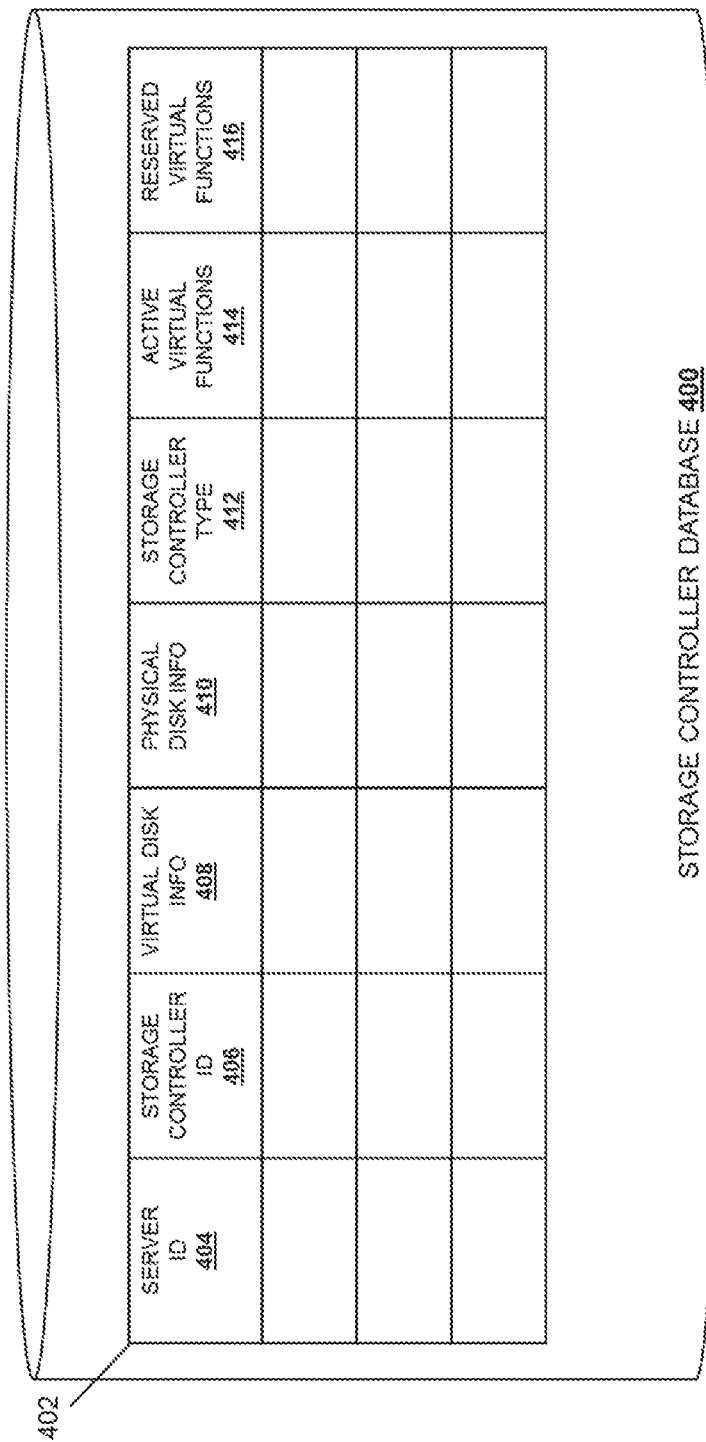
FIG. 4 is a schematic view illustrating an embodiment of a storage controller database used in the chassis management controller of FIG. 3.

Referring now to FIG. 4, an embodiment of a storage controller database 400 is illustrated that may be the storage controller database 308 discussed above with reference to FIG. 3. As such, the storage controller database 400 may be provided on one or more storage devices that are included in and/or coupled to the storage controller determination engine 304. In the illustrated embodiment, the storage controller database 400 includes a failover system table 402 that is configured to store information about the components of the storage controller failover system 200, including storage controller configuration data for each of the storage controllers 208*a-f*. For example, the failover system table 402 includes a server identifier column 404 that is configured to include identifiers for any of the servers 204*a-e*, a storage controller identifier column 406 that is configured to include identifiers for any of the storage controllers 208*a-f*, a virtual disk information column 408 that is configured to include information about virtual disks that may be provided by the RAID subsystems 212-220, a physical disk information column 410 that is configured to include information about physical disks such as the storage devices 212*a-220a*, a storage controller type column 414 that is configured to detail the sharing status of any of the storage controllers 208*a-f*, an active virtual functions column 414 that is configured to detail active virtual functions provided by any of the storage controllers 208*a-f* (if applicable), and a reserved virtual functions column 416 that is configured to detail reserved virtual functions provided by any of the storage controllers 208*a-f* (if applicable). The use of the failover system table 402 is described in further detail in the examples provided below, but one of skill in the art in possession of the present disclosure will recognize that other information may be included in the failover system table 402 and utilized to provide the functionality discussed below while remaining within the scope of the present disclosure.

Figure 5:
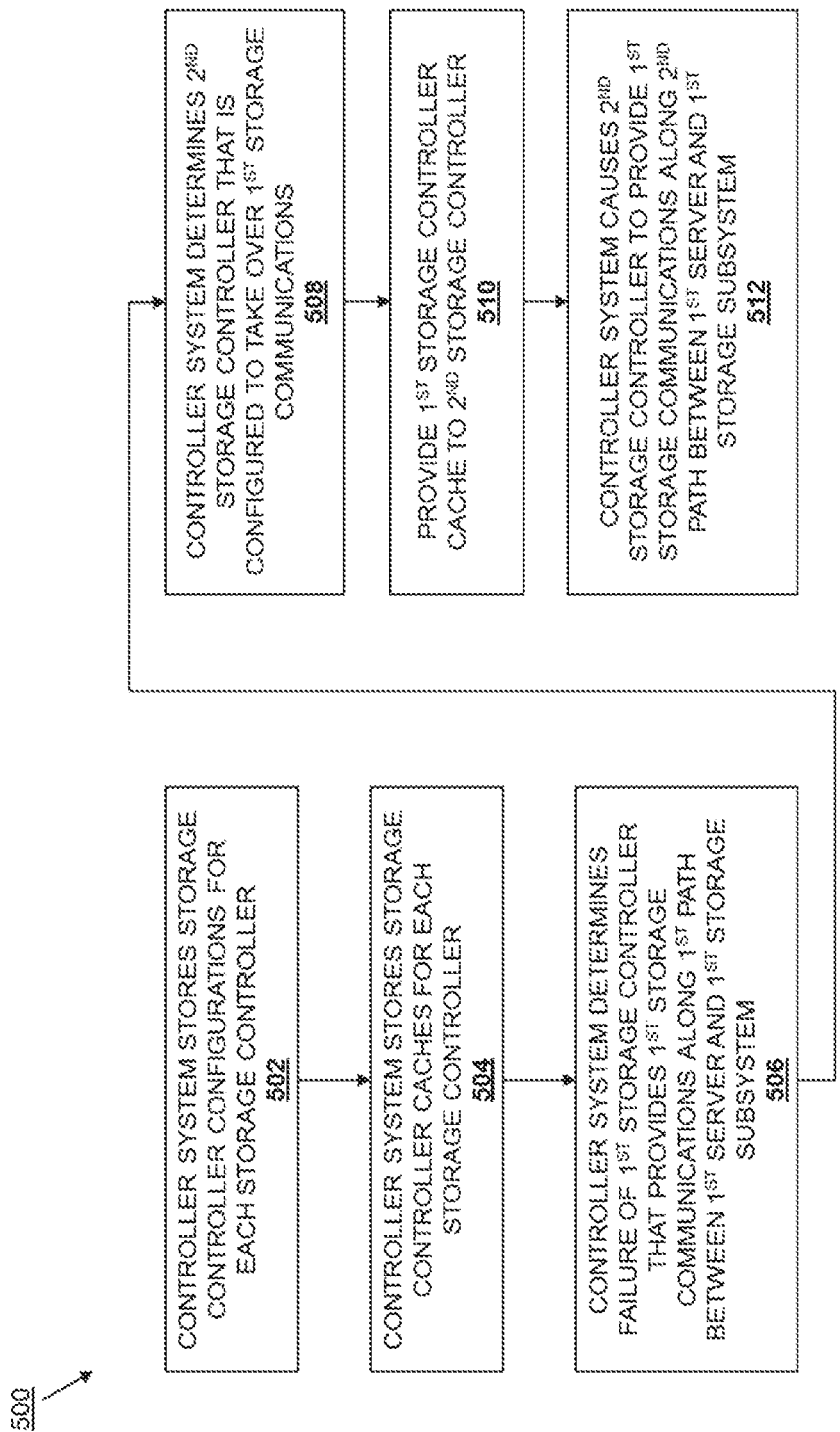
FIG. 5 is a flow chart illustrating an embodiment of a method for providing storage controller failover.

Referring now to FIG. 5, an embodiment of a method 500 for providing storage controller failover is illustrated. As discussed below, the systems and method of the present disclosure provide for storage controller failover by storing configuration and caches for each of the active storage controllers in the system such that, upon failure of a first storage controller that is providing first storage communications along a first path between a first server and a first storage subsystem, a second storage controller may be selected based on its stored configuration (e.g., based on that second storage controller handling the smallest communications load compared to the rest of the storage controllers in the system, considering virtual functions reserved for failover in shared storage controller system, etc.) to take over the first storage communications, and that second storage controller may be provided the stored cache of the first storage controller such that the second storage controller may provide the first storage communications along a second path between the first server and the first storage subsystem. As such, automated storage controller failover is enabled that eliminates the need for an administrator to perform some manual configuration of a redundant storage controller in response to a storage controller failure, while maintain the coherency of the cache of the failed storage controller in the redundant (now active) storage controller. As discussed below, such systems and methods enable the ability to provide an "active/active" storage controller systems that utilize a "redundant" storage controller prior to an active storage controller failure (i.e., as compared to the "active/passive" storage controller systems discussed above that only utilize the redundant storage controller in the event of a storage controller failure), thus increasing the cost effectiveness of the redundant storage controller and the overall efficiency of the system.

The method 500 begins at block 502 where a controller system stores storage controller configurations for each of a plurality of storage controllers. In an embodiment, each of the servers 204a-204e may be configured such that, at block 502, each of those servers 204a-204e sends respective storage controller configuration data that is received from the storage controller used by that server to the chassis management controller 224. For example, each of the servers 204a-204e may be configured to receive storage controller configuration data from the storage controller that server uses to access the RAID subsystems 212-220 and, in response, send that storage controller configuration data to the chassis management controller 224 upon power up, reboot, reset, and/or other initialization actions known in the art; each time that storage controller configuration data is changed, modified, and/or otherwise subject to an action that results in that storage controller configuration data being different than storage controller configuration data stored for that storage controller in the chassis management controller 224; periodically based on a time schedule; and/or in response to any other situation where one of skill in the art in possession of the present disclosure would recognize a storage controller configuration data update to the chassis management controller 224 would be appropriate to accomplish the failover functionality discussed below.

In a specific example, a remote access controller in a server may determine that the configuration of the storage controller used by that server has changed and may provide an alert of that change to the chassis management controller 224. In response, the chassis management controller 224 may then request a storage controller inventory from the remote access controller in order to have the remote access controller return storage controller inventory details (that include the storage controller configuration data) to the chassis management controller 224. In an embodiment, at block 502, the storage controller determination engine 304 in the chassis management controller 224/300 may receive the storage controller configuration data from any or all of the servers 204a-e through the communication system 306 and, in response, store that storage configuration data in the storage controller database 308.

With reference to the failover system table 402 in the storage controller database 400 in FIG. 4, some embodiments of storage controller configuration data received and stored at block 502 may include an identifier for the server sending that storage controller configuration data that may be stored in the server identifier column 404, an identifier for the storage controller used by the server sending that storage controller configuration data that may be stored in the storage controller identifier column 406, information about virtual disks (e.g., a RAID subsystem identifier) accessed by the storage controller used by the server sending that storage controller configuration data that may be stored in the virtual disk information column 408, information about physical disks (e.g., storage device identifiers) accessed by the storage controller used by the server sending that storage controller configuration data that may be stored in the physical disk information column 410, a sharing status of the storage controller used by the server sending that storage controller configuration data that may be stored in the storage controller type column 414, and where applicable, information about active virtual functions provided by the storage controller used by the server sending that storage controller configuration data that may be stored in the active virtual functions column 414, and information about reserved virtual functions provided by the storage controller used by the server sending that storage controller configuration data that may be stored in the reserved virtual functions column 416. In addition, other storage controller information stored in the storage controller database 308 may include storage subsystem level information (e.g., RAID0, 1, 5, 10, 50, etc., as well as any other storage subsystem and/or storage controller information known in the art. While a few examples of storage controller configuration data are provided above, one of skill in the art in possession of the present disclosure will recognize that any data describing the configurations and/or properties of the storage controllers 208a-f may be provided to the chassis management controller 224 and stored in the storage controller database 308 while remaining within the scope of the present disclosure.

As discussed above, some embodiments of storage controller configuration data include information about active virtual functions and reserved virtual functions provided by the storage controller associated with that storage controller configuration data. As would be understood by one of skill in the art in possession of the present disclosure, any of the servers 204a-e may include processing systems with multiple cores, and in some embodiments, each core may operate to provide a virtual machine that may be dedicated to a particular function utilized with that server (e.g., an email virtual machine, a database virtual machine, an directory virtual machine, etc.) Furthermore, as discussed in further detail below with regard to embodiments in which shared storage controllers are utilized, such shared storage controllers used by the server(s) may operate to provide virtual functions or virtual adaptors for virtual machines provided on the cores of the processing systems of the servers. For example, a shared storage controller may provide a first virtual function or virtual adaptor to provide virtual disk/storage device access to an email virtual machine, a second virtual function or virtual adaptor to provide virtual disk/storage device access to a database virtual machine, a third virtual function or virtual adaptor to provide virtual disk/storage device access to a directory virtual machine, and so on.

The maximum number of virtual functions or virtual adaptors available on a shared storage controller typically ranges from 64 to 256, but it has been found that conventional systems tend to only use a fraction of those (e.g., 8) and, as such, a large surplus of available virtual functions or virtual adaptors are typically present in any given shared storage controller. The systems and methods of the present disclosure take advantage of this virtual function/virtual adaptor surplus by including shared storage controllers that provide virtual functions or virtual adaptors to servers (referred to as "active virtual functions" herein), while holding virtual functions or virtual adaptors to take over virtual function/virtual adaptor provisioning for other storage controllers in the system in the event those storage controllers fail (referred to herein as "reserved virtual functions"). As such, shared storage controllers may determine active and reserved virtual functions/virtual adaptors, provide information about those active and reserved virtual functions/virtual adaptors to their servers, and that information may be provided as storage controller configuration data to the chassis management controller 224 at block 502.

The method 500 then proceeds to block 504 where the controller system stores storage controller caches for each of the plurality of storage controllers. As illustrated and discussed in further detail below, in some embodiments the server switching system 206 may include a memory/storage subsystem (e.g., an internal flash memory subsystem included on the circuit board that provides the server switching system 206), while in other embodiments the server switching system 206 may be couple to a memory/storage subsystem (e.g., an external flash memory solid state drive (SDD) that may provide a lower performance than internal flash memory subsystems but with a higher storage capacity). In either embodiment, the server switching system 206 may include a high-speed interconnect between the memory/storage subsystem and the storage controllers 208a-f. As discussed above, each of the storage controllers 208a-f includes a storage controller cache that is utilized in performing storage controller functionality that allows the servers 204a-e to access the RAID subsystems 212-220. In an embodiment, at block 504, the storage controllers 208a-f (e.g., a core in a processing system of the storage controller) may operate to mirror, copy, and/or otherwise provide their respective storage controller caches through the high speed interconnect on the server switching system 206 for storage on the memory/storage subsystem (e.g., the internal flash memory storage subsystem or the external flash memory SSD), which may be partitioned for the storage controllers 208a-f by the switch controller 222. As such, a mirror/copy of the storage controller cache for each of the storage controllers 208a-f may be provided on a memory/storage subsystem that is separate from those storage controllers and accessible in or through the server switching system 206. In some embodiments, CACHECADE™ technology may be utilized with that memory/storage subsystem to identify frequently accessed areas within the storage controller caches for mirroring or copying those cache areas to the memory/storage subsystem, which has been found to increase performance associated with accessing the cache database/storage.

The method 500 then proceeds to block 506 where the controller system determines a failure of a first storage controller that provides first storage communications along a first path between a first server and a first storage subsystem. In an embodiment, at block 506, each of the servers 204a-e may be configured to determine that the storage controller that is being used by that server to access the RAID subsystems 212-220 has failed or otherwise become unavailable and, in response, report that failure to the chassis management controller 224. For example, any of the storage controllers 204a-e in the storage controller failure system 200 may fail or otherwise become unavailable in response to the cache in that storage controller becoming inaccessible or unavailable, in response to firmware for that storage controller being corrupted or updated incorrectly, in response to communication difficulties with that storage controller, and/or in response to other storage controller failure scenarios known in the art.

The report of the failure of a storage controller at block 506 may include an identifier of the server reporting that failure, an identifier for the storage controller that has failed, and/or any other storage controller failure data that may be helpful in performing the failover functionality discussed below. At block 506, the storage management determination engine 304 may receive the report of the failure of any of the storage controllers 208a-f through the communication system 306. Any storage device that fails or otherwise becomes unavailable at block 506 will have previously been providing first storage communications along a first path between the server that reported the failure of the storage controller to the chassis management controller 224, and at least one of the RAID subsystems 212-220. A few specific examples of first storage communications provided by a storage controller along a first path between a server and a RAID subsystem are illustrated and described below, but one of skill in the art in possession of the present disclosure will recognize that any of the storage controllers that provide similar storage communications along any other path may fail and have associated failover provided while remaining within the scope of the present disclosure.

Figure 6A:
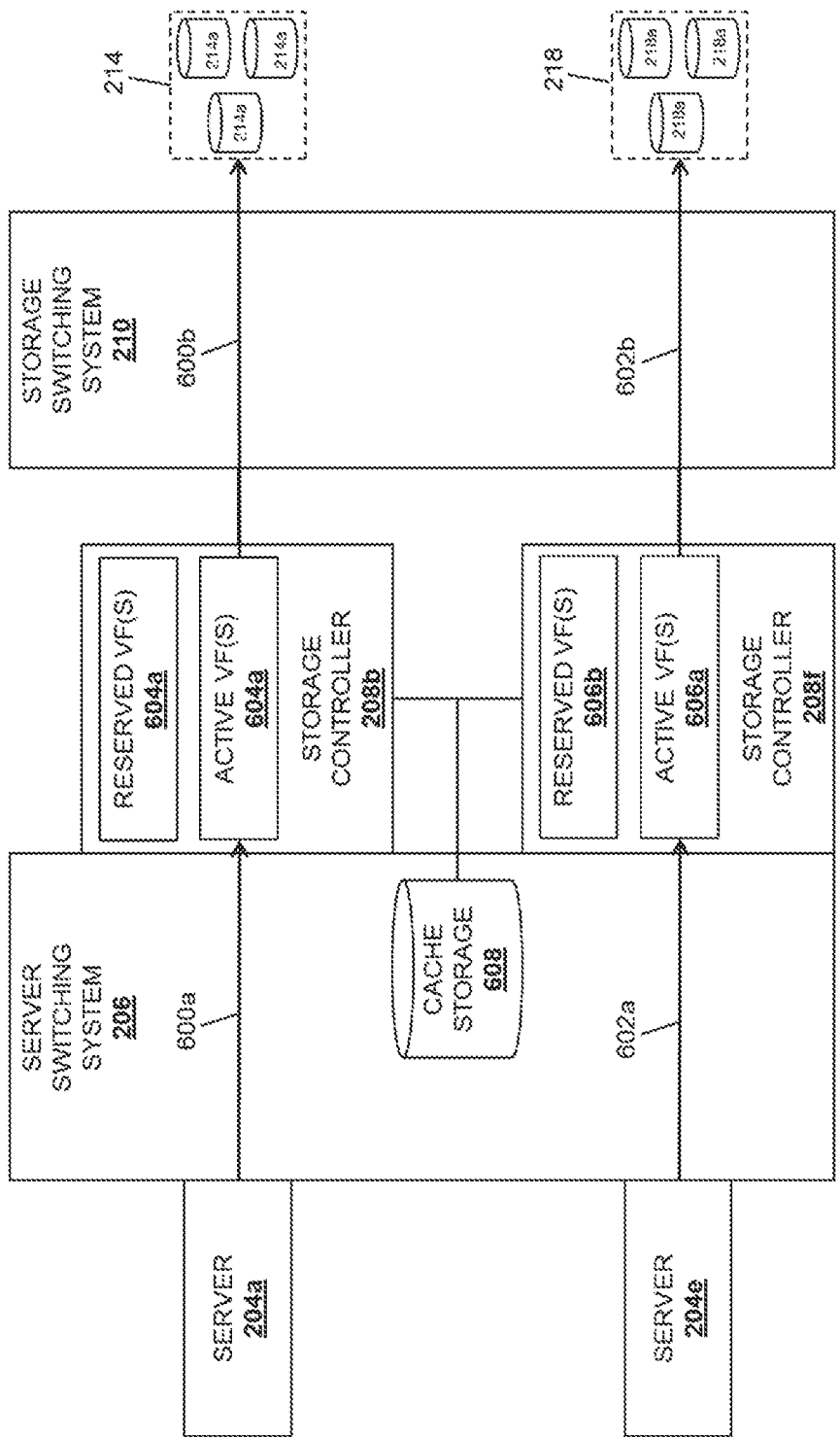
FIG. 6a is a schematic view illustrating an embodiment of communications in a storage controller failover system prior to a storage controller failure.

Referring to FIG. 6a, an embodiment is illustrated of shared storage controllers providing storage communications between servers and RAID subsystems. In particular, that embodiment includes the shared storage controller 208b providing the server 204a first storage communications along a first path 600a/600b to the RAID subsystem 214, and the shared storage controller 208f providing the server 204e second storage communications along a second path 602a/602b to the RAID subsystem 218. In the specific example illustrated in FIG. 6a, the shared storage controller 208b provides one or more active virtual functions 604a that enable the first storage communications between the server 204a and the RAID subsystem 214 along the first path 600a/600b, and includes one or more reserved virtual functions 604b that may be reserved for any other storage controllers in the storage controller failover system 200.

Similarly, the shared storage controller 208f provides one or more active virtual functions 606a that enable the second storage communications between the server 204e and the RAID subsystem 218 along the second path 602a/602b, and includes one or more reserved virtual functions 60bb that may be reserved for any other storage controllers in the storage controller failover system 200. Furthermore, FIG. 6a provides an embodiment where a cache storage 608 is provided in the server switching system 206 by, for example, the internal flash memory subsystem included on the circuit board that provides the server switching system 206. As discussed below, at block 506 in this embodiment, the storage controller 208b fails or otherwise becomes unavailable and, in response, the server 204a reports the failure of the storage controller 208b to the chassis management controller 224 substantially as described above.

Figure 7A:
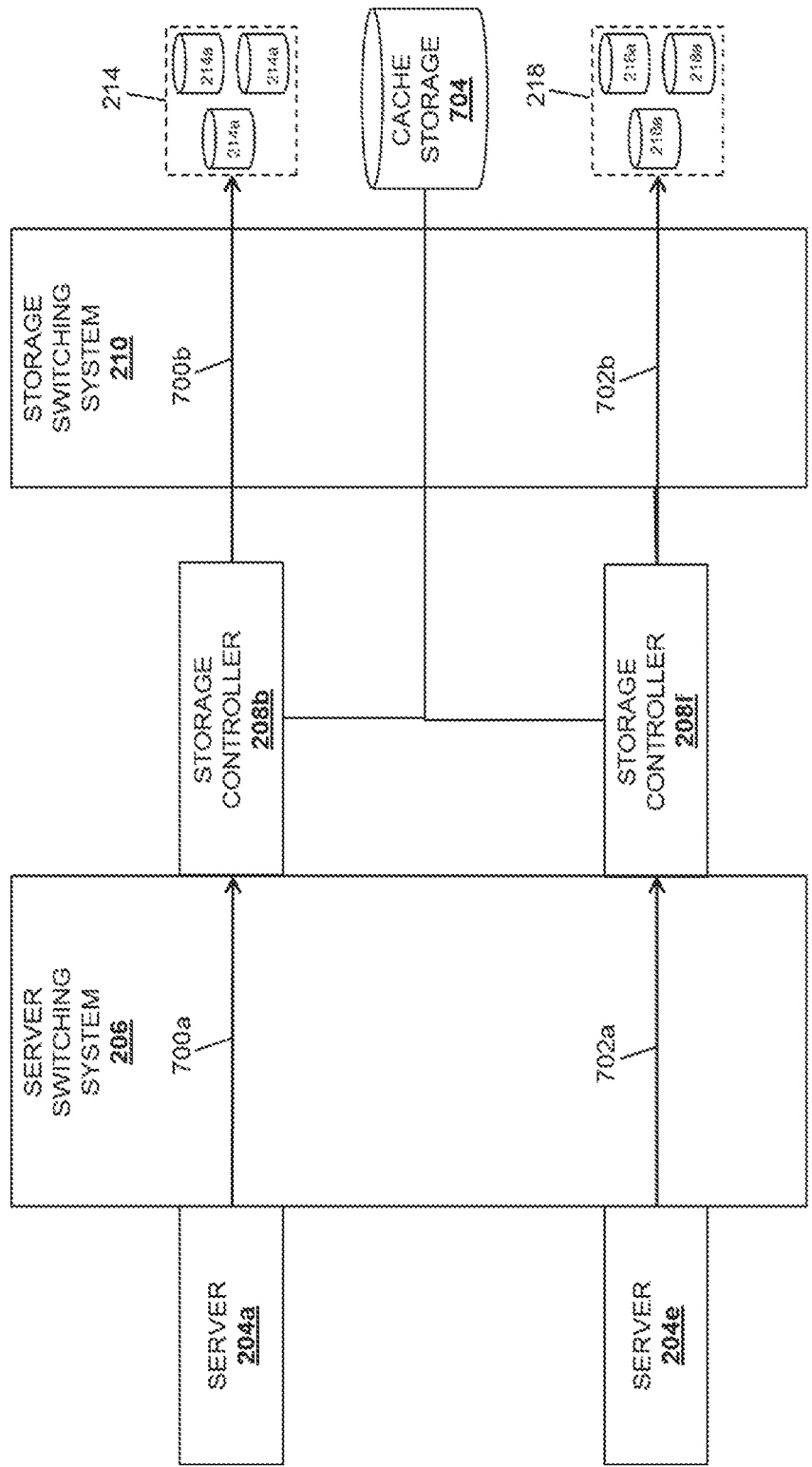
FIG. 7a is a schematic view illustrating an embodiment of communications in a storage controller failover system prior to a storage controller failure.

Referring to FIG. 7a, an embodiment is illustrated of non-shared storage controllers providing storage communications between servers and RAID subsystems. In particular, that embodiment includes the storage controller 208b providing the server 204a first storage communications along a first path 700a/700b to the RAID subsystem 214, and the storage controller 208f providing the server 204e second storage communications along a second path 702a/702b to the RAID subsystem 218. One distinction between the shared storage controllers illustrated in FIG. 6a and the non-shared storage controllers illustrated in FIG. 7a is the lack of virtual functions provided by the non-shared storage controllers 208b and 208f to the servers 204a and 204e.

Furthermore, FIG. 7a provides an embodiment where a cache storage 704 is coupled to the server switching system 206 (e.g., through the storage switching system 210) and provided by, for example, the external flash memory SSD coupled to the server switching system 206. As discussed below, at block 506 in this embodiment, the storage controller 208b fails or otherwise becomes unavailable and, in response, the server 204a reports the failure of the storage controller 208b to the chassis management controller 224 substantially as described above.

Following the determination of the failure of a storage controller at block 506, the method 500 then proceeds to block 508 where the controller system determines a second storage controller that is configured to take over the first storage communications. In an embodiment, in response to the report of the failure of a storage controller, the storage controller determination engine 304 in the chassis management controller 224/300 may utilize storage controller failure data provided in the report of the failure of the storage controller (e.g., a server identifier of the server reporting the failure, a storage controller identifier of the storage controller that has failed, etc.) with the storage controller database 308 to retrieve storage controller configuration data that was previously stored for the storage controller that has failed. While the determination of the second storage controller is described as following the determination of the failure of the first storage controller, in many embodiments the determination of the second storage controller may be performed prior to any first storage controller failure. For example, the chassis management controller 224 may determine alternative storage controllers that may take over for any active storage controller that may fail in response to receiving updated configuration data for those active storage controllers, and may store the identified alternative storage controllers in the storage controller database 308. As such, upon the failure of any active storage controller, the alternative storage controller may be immediately activated to take over the storage communications that were being handled by the failed storage controller. The specific examples begun above with reference to FIGS. 6a and 7a are continued below to illustrated embodiments of block 506, but as with the above examples, one of skill in the art in possession of the present disclosure will recognize that the determination of a second storage controller that is configured to take over first storage communications from a failed first storage controller may be performed in a variety of manners while remaining within the scope of the present disclosure.

Referring now to FIG. 6b, and continuing the example of the shared storage controller failure scenario begun above with reference to FIG. 6a, the storage controller database 308/400 in the chassis management controller 224/300 is illustrated including a plurality of storage controller configuration data for the storage controllers 208b and 208f. In the illustrated embodiment, a row 610 in the failover system table 402 includes storage controller configuration data stored for the storage controller 208b, including an identifier for the server providing that storage controller configuration data (server 204a) in the server identifier column 404, an identifier for the storage controller (storage controller 208b) in the storage controller identifier column 406, virtual disk information about the virtual disk(s) accessible by the storage controller 208b (RAID subsystem 214) in the virtual disk information column 408, physical disk information about the physical disk(s) accessible by the storage controller 208b (storage devices 214a) in the physical disk information column 410, a storage controller type of the storage controller 208b (shared) in the storage controller type column 412, active virtual functions provided by the storage controller 208b (active VFs 604a) in the active virtual function column 414, and reserved virtual functions provided by the storage controller 208b (reserved VFs 604b) in the reserved virtual functions column 416.

Similarly, the row 612 in the failover system table 402 includes storage controller configuration data stored for the storage controller 208f, including an identifier for the server providing that storage controller configuration data (server 204a) in the server identifier column 404, an identifier for the storage controller (storage controller 208f) in the storage controller identifier column 406, virtual disk information about the virtual disk(s) accessible by the storage controller 208f (RAID subsystems 214 and 218) in the virtual disk information column 408, physical disk information about the physical disk(s) accessible by the storage controller 208f (storage devices 214a and 218a) in the physical disk information column 410, a storage controller type of the storage controller 208f (shared) in the storage controller type column 412, active virtual functions provided by the storage controller 208f (active VFs 606a) in the active virtual function column 414, and reserved virtual functions provided by the storage controller 208f (reserved VFs 606b) in the reserved virtual functions column 416.

In the embodiment illustrated in FIG. 6b, at block 508 the storage controller determination engine 304 may access the storage controller database 308/400 and, using the storage controller failure data (e.g., the storage controller identifier for the failed storage controller 208b), may retrieve any or all of the storage controller configuration data in row 610 (i.e., the storage controller configuration data that provides the configuration of the storage controller 208b prior to its failure). Using the storage controller configuration data retrieved for the failed storage controller 208b, the storage controller determination engine 304 may search the configuration data stored in the storage controller database 308/400 for other storage controllers with configurations that indicate that those storage controller(s) are configured to take over the first storage communications that were being handled by the storage controller 208b prior to its failure. For example, the storage controller determination engine 304 may search the storage controller database 308/400 and determine that the storage configuration data for the storage controller 208f in row 612 of the failover system table 402 indicates that the storage controller 208f is configured to take over the first storage communications based on that storage controller having access to the RAID subsystems 214 (which were part of the first storage communications provided by the failed storage controller 208b), having access to the storage devices 214a (which were part of the first storage communications provided by the failed storage controller 208b), being a shared storage controller (as was the failed storage controller 208b), and/or including reserved virtual functions 606b that correspond to the active virtual functions 604a that were being provided by the storage controller 208b prior to its failure.

Figure 7B:
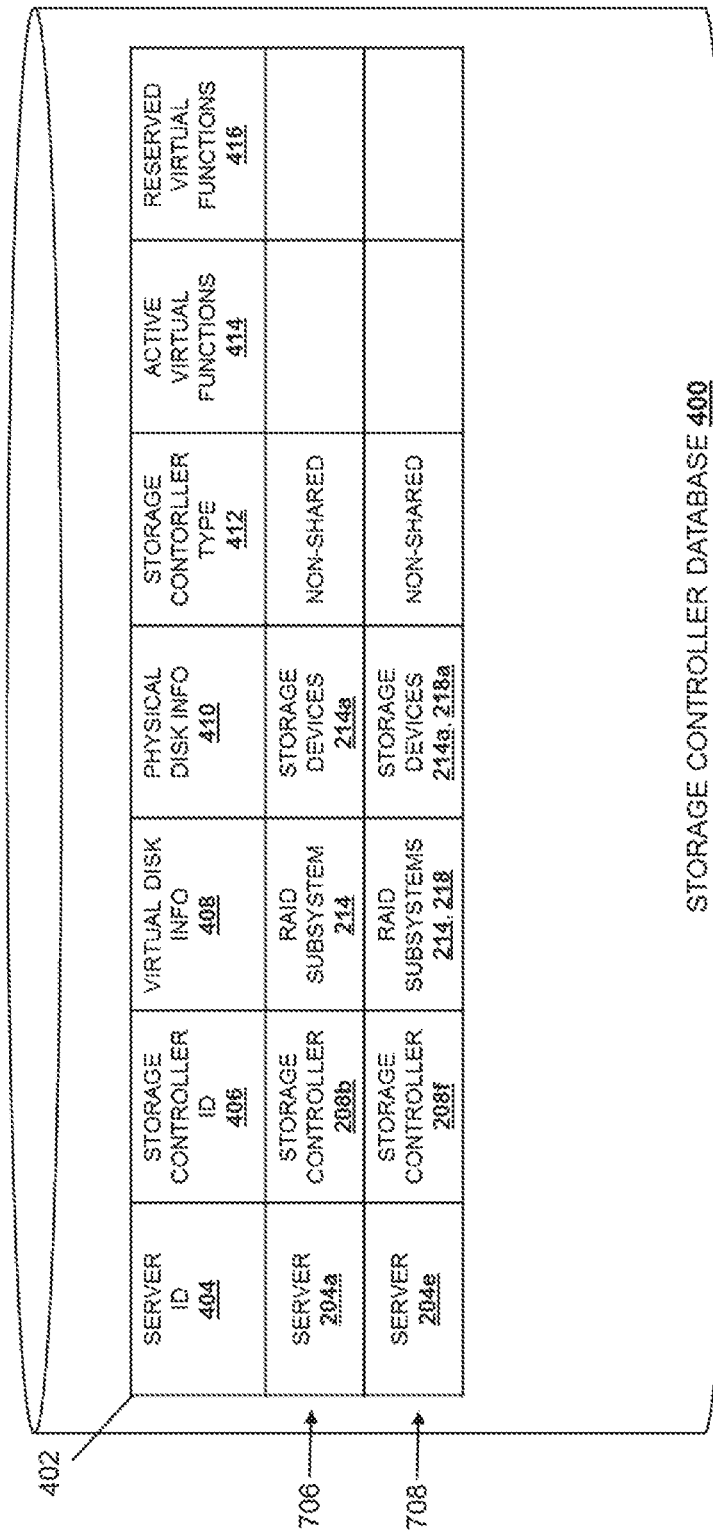

Referring now to FIG. 7b, and continuing the example of the non-shared storage controller failure scenario begun above with reference to FIG. 7a, the storage controller database 308/400 in the chassis management controller 224/300 is illustrated including a plurality of storage controller configuration data for the storage controllers 208b and 208f. In the illustrated embodiment, a row 706 in the failover system table 402 includes storage controller configuration data stored for the storage controller 208b, including an identifier for the server providing that storage controller configuration data (server 204a) in the server identifier column 404, an identifier for the storage controller (storage controller 208*b*) in the storage controller identifier column 406, virtual disk information about the virtual disk(s) accessible by the storage controller 208*b* (RAID subsystem 214) in the virtual disk information column 408, physical disk information about the physical disk(s) accessible by the storage controller 208*b* (storage devices 214*a*) in the physical disk information column 410, and a storage controller type of the storage controller 208*b* (non-shared) in the storage controller type column 412. It is noted that, in the illustrated embodiment, active virtual functions and reserved virtual functions are not provided by the non-shared storage controller 208*b* and thus no entries are included in the active virtual functions column 414 and the reserved virtual functions column 416.

Similarly, the row 708 in the failover system table 402 includes storage controller configuration data stored for the storage controller 208*f* including an identifier for the server providing that storage controller configuration data (server 204*a*) in the server identifier column 404, an identifier for the storage controller (storage controller 208*f*) in the storage controller identifier column 406, virtual disk information about the virtual disk(s) accessible by the storage controller 208*f* (RAID subsystems 214 and 218) in the virtual disk information column 408, physical disk information about the physical disk(s) accessible by the storage controller 208*f* (storage devices 214*a* and 218*a*) in the physical disk information column 410, and a storage controller type of the storage controller 208*f* (non-shared) in the storage controller type column 412. It is noted that, in the illustrated embodiment, active virtual functions and reserved virtual functions are not provided by the non-shared storage controller 208*f* and thus no entries are included in the active virtual functions column 414 and the reserved virtual functions column 416.

In the embodiment illustrated in FIG. 7*b*, at block 508 the storage controller determination engine 304 may access the storage controller database 308/400 and, using the storage controller failure data (e.g., the storage controller identifier for the failed storage controller 208*b*), may retrieve any or all of the storage controller configuration data in row 610 (i.e., the storage controller configuration data that provides the configuration of the storage controller 208*f* prior to its failure). Using the storage controller configuration data retrieved for the failed storage controller 208*b*, the storage controller determination engine 304 may search the configuration data stored in the storage controller database 308/400 for other storage controllers with configurations that indicate that those storage controller(s) may take over the first storage communications that were being handled by the storage controller 208*b* prior to its failure. For example, the storage controller determination engine 304 may search the storage controller database 308/400 and determine that the storage configuration data for the storage controller 208*f* in row 708 of the failover system table 402 indicates that the storage controller 208*f* is configured to take over the first storage communications based on that storage controller having access to the RAID subsystems 214 (which were part of the first storage communications provided by the failed storage controller 208*b*), having access to the storage devices 214*a* (which were part of the first storage communications provided by the failed storage controller 208*b*), and/or being a non-shared storage controller (as was the failed storage controller 208*b*).

While only the storage controller configuration data for the storage controller 208*f* is illustrated and described above as indicating that the storage controller 208*f* is configured to take over the first storage communications that were being handled by the storage controller 208*b* prior to its failure, in many embodiments, several of the storage controllers 208*a-f* may be configured to take over the first storage communications that were being handled by the storage controller 208*b* prior to its failure. In such embodiments, the storage controller determination engine 304 may determine the storage communication loads (e.g., the bandwidth of storage communications) being handled by each storage controller that is configured to take over the first storage communications, and then select the storage controller that is currently handling the smallest storage communication load to take over those first storage communications. In event no single storage controller includes sufficient available bandwidth to take over the entire first storage communication load, a plurality of the storage controllers that are configured to take over the first storage communications may be selected to take over portions of that first storage communication load. While a specific example of storage communication bandwidth has been described as being used to determine which of a plurality of storage controllers (all of which are configured to take over the first storage communications) to take over the first storage communications, one of skill in the art in possession of the present disclosure will recognize that other communications characteristics may be utilized in selecting one of a plurality of storage controllers that are all configured to take over the first storage communications while remaining within the scope of the present disclosure.

The method 500 then proceeds to block 510 where the first storage controller cache is provided to the second storage controller. In an embodiment, at block 510 the storage controller determination engine 304 in the chassis management controller 224/300 communicates with the switch controller 222 (e.g., via the communication system 306) to inform the switch controller 222 that the second storage controller (e.g., the storage controller 208*f* in the examples discussed above) has been selected to take over the first storage communications from the first storage controller that failed (e.g., the storage controller 208*b* in the examples discussed above). In response, the switch controller 222 operates to copy the storage controller cache for the first storage controller that failed to the second storage controller that has been selected to take over the first storage communications from the first storage controller. For example, with reference to FIG. 6*a*, the switch controller 222 may retrieve the storage controller cache for the storage controller 208*b* that was mirrored to the cache storage 608 and copy that storage controller cache to the storage controller 208*f*. Similarly, with reference to FIG. 7*a*, the switch controller 222 may retrieve the storage controller cache for the storage controller 208*b* that was mirrored to the cache storage 704 and copy that storage controller cache to the storage controller 208*f*. One of skill in the art in possession of the present disclosure will recognize that the performance of block 510 of the method 500 provides for automated cache coherency in the failover operations that switch the handling of the first storage communications from the failed first storage controller to the second storage controller.

The method 500 then proceeds to block 512 where the controller system causes the second storage controller to provide the first storage communications along a second path between the first server and the first storage subsystem. In an embodiment, at block 512 the communications by the storage controller determination engine 304 in the chassis management controller 224/300 with the switch controller 222 to inform the switch controller 222 that the second storage controller was selected to take over the first storage communications from the first storage controller that failed may also cause the switch controller 222 to active a new, second path through the second storage controller to provide the first storage communications between the first server and the first storage subsystem. For example, at block 512, the switch controller 222 may configure any or all of the first server, the server switching system 206, the second storage controller, the storage switching system 210, and/or the first storage subsystem to enable a second path (which is different than the first path provided by the failed first storage controller) for the first storage communications, while also initiating a disk migration (e.g., performed by the remote access controller(s) in the server(s) 204a and/or 204a) to transfer data utilized by the failed first storage controller to the second storage controller (storage controller configuration data) that enables the second storage controller to control the virtual/physical disks in the first storage subsystem.

Figure 6C:
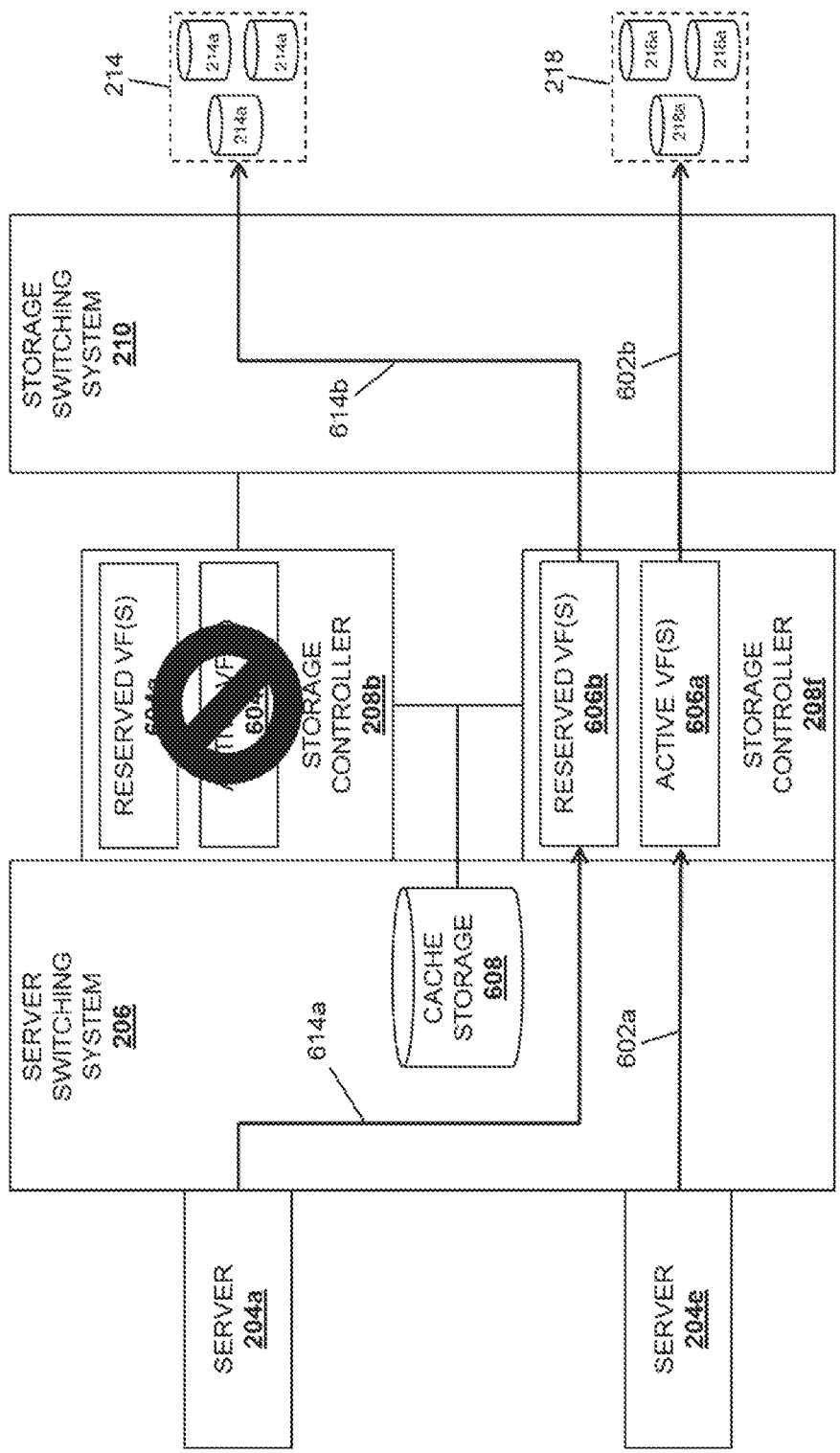
FIG. 6c is a schematic view illustrating an embodiment of communications in the storage controller failover system of FIG. 6a subsequent to providing storage controller failover.

Referring now to FIG. 6c, and continuing the example of the shared storage controller failure scenario discussed above with reference to FIGS. 6a and 6b, the operation of the switch controller 222 at block 512 may configure any or all of the server 204a, the server switching system 206, the storage controller 208f, the storage switching system 210, and the RAID subsystem 214 to provide a second path 614a/614b for the first storage communications between the server 204a and the RAID subsystem 214. In the illustrated embodiment, the storage controller 208f provides the second path 614a/614b for the first storage communications using the reserved virtual functions 606b. As discussed above, the storage controller 208f may be provided the storage controller configuration data from the failed storage controller 208b that allows the storage controller 208f to control the RAID subsystem 214 in order to provide the first storage communications between the server 204a and the RAID subsystem 214.

Figure 7C:
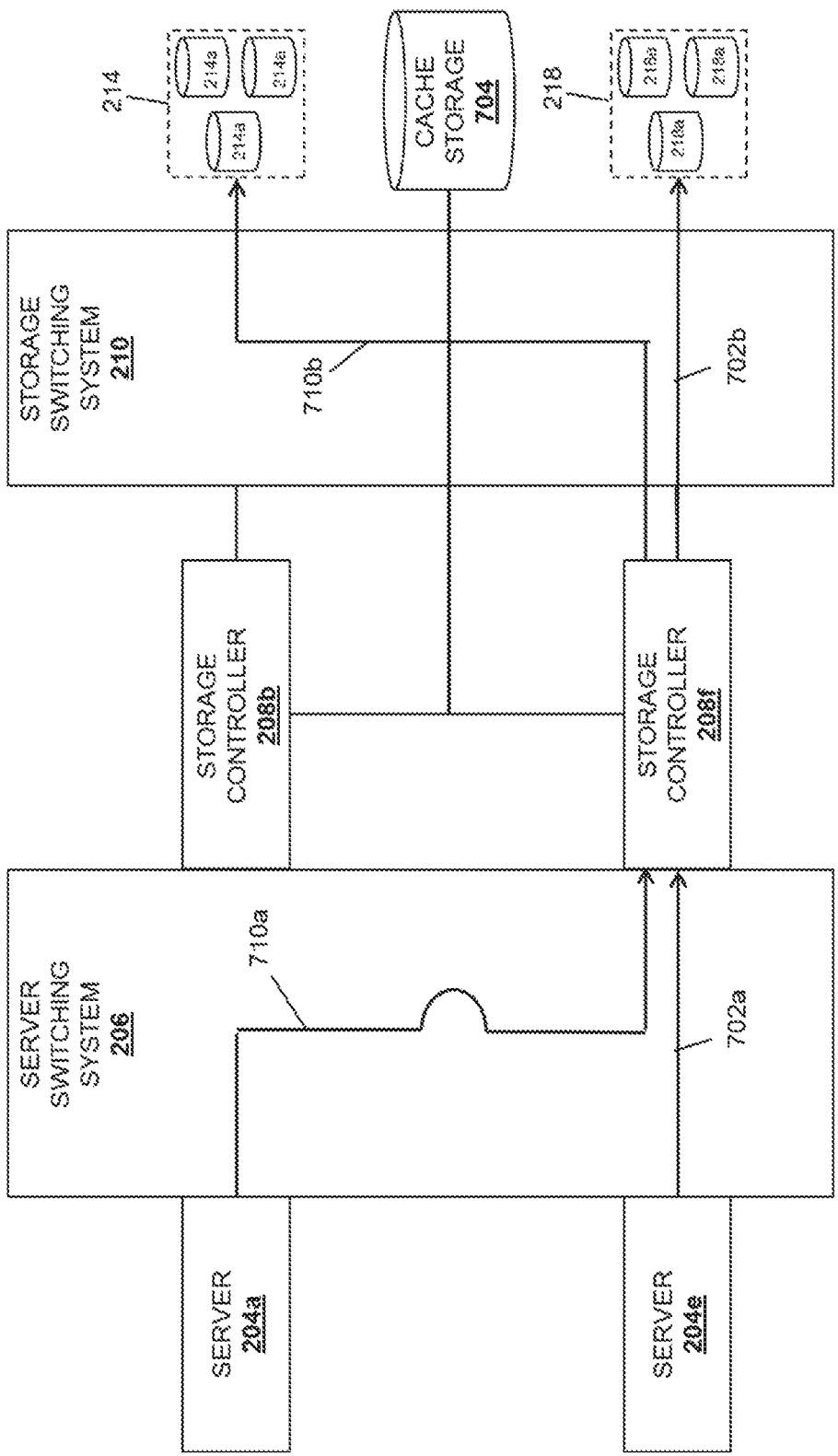
FIG. 7c is a schematic view illustrating an embodiment of communications in the storage controller failover system of FIG. 7a subsequent to providing storage controller failover.

Referring now to FIG. 7c, and continuing the example of the non-shared storage controller failure scenario discussed above with reference to FIGS. 7a and 7b, the operation of the switch controller 222 at block 512 may configure any or all of the server 204a, the server switching system 206, the storage controller 208f, the storage switching system 210, and the RAID subsystem 214 to provide a second path 710a/710b for the first storage communications between the server 204a and the RAID subsystem 214. As discussed above, the storage controller 208f may be provided the storage controller configuration data from the failed storage controller 208b that allows the storage controller 208f to control the RAID subsystem 214 in order to provide the first storage communications between the server 204a and the RAID subsystem 214. In some embodiments, the provisioning of the second path 702a/702b between the server 204e and the RAID subsystem 218, and the second path 701a/710b between the server 204a and the RAID subsystem 214, may be provided by utilizing Management Control Transport Protocol (MCTP) communications that are multiplexed with the PCIe bus between the servers 204a and 204e, with the server 204a utilizing the PCIe VDM channel available through its remote access controller, and the server 204e utilizing the PCIe channel. One of skill in the art in possession of the present disclosure will recognize that such an embodiment may provide lower performance due to the multiplexing, but will not require additional hardware (e.g., a separate high bandwidth bus). However, provisioning of multiple high bandwidth buses will fall within the scope of the present disclosure as well.

Figure 8:
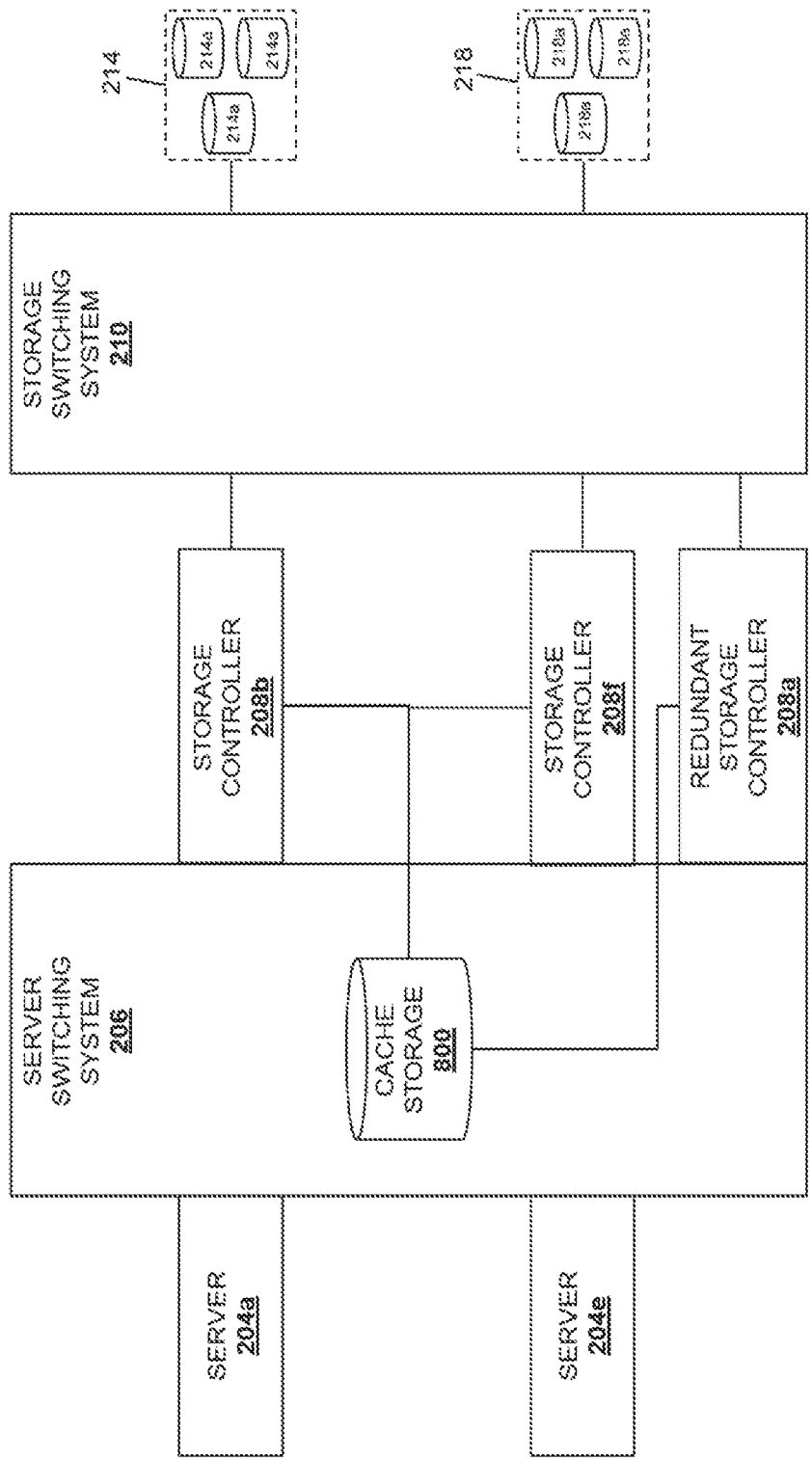
FIG. 8 is a schematic view illustrating an embodiment of a storage controller failover system including a redundant storage controller.

Referring now to FIG. 8, an embodiment of the storage controller failover system 200 utilizing a redundant storage controller 208a is illustrated. The storage controller failover system 200 with the redundant storage controller 208a in FIG. 8 includes a cache database 800 that is provided in the server switching system 206 (similar to the embodiments illustrated and discussed above with reference to FIGS. 6a-c), while including non-shared storage controllers 208b, 208f, and 208a (similar to the embodiments illustrated and discussed above with reference to FIGS. 7a-c), illustrating but one example of the wide variety of modification that may be provided with examples of the storage controller failover systems discussed above. In embodiments that utilize a redundant storage controller, the teachings of the present disclosure may be utilized to provide an "active" redundant storage controller (and thus an "active/active" storage controller failover system) by allowing the redundant storage controller to perform storage controller operations even when none of the active storage controllers in the system have failed.

For example, the storage controller determination engine 304 may utilize storage controller configurations and monitoring to determine that each of the active storage controllers (e.g., the storage controllers 208b and 208f in the illustrated embodiment) are operating at their maximum capacity or configurations and, in response, configure the redundant storage controller 208a to operate to provide storage controller communications to assist any of the active storage controllers in providing their storage communications (e.g., using the storage controller cache and storage controller configurations as discussed above to enable additional data paths between servers and their storage subsystems). Furthermore, in the event of a storage controller failover, the redundant storage controller 208a may then be operated as the second storage controller described in the method 500 above to take over storage communications for the failed storage controller. As such, in some embodiments, when the redundant storage controller 208a is utilized prior to a failure of any active storage controller, that utilization may be configured such that the redundant storage controller 208a is provided with as minimal a storage communication load as possible while handling relatively less critical storage communications and performing relatively less critical operations compared to the active storage controllers.

Thus, systems and methods have been described that provide for storage controller failover by storing configurations and caches for each of the active storage controllers in a system such that, upon failure of any storage controller in the system, another storage controller may be selected to automatically take over the storage communications for that failed storage controller while maintaining cache coherency. As such, automated storage controller failover is provided that eliminates the need for an administrator to perform some manual configuration of a redundant storage controller in response to a storage controller failure, while enabling active/active storage controller systems that utilizes "redundant" storage controllers prior to the failure of any of the active storage controllers in the system, thus increasing the cost effectiveness and overall efficiency of the system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A storage controller failover system, comprising:
a first storage controller;
a second storage controller; and
a controller system that is coupled to each of the first storage controller and the second storage controller, wherein the controller system is configured to:
determine that the first storage controller that has provided first storage communications along a first path between a first server and a first storage subsystem has failed;
determine that the second storage controller is configured to take over the first storage communications from the first storage controller;
copy, in response to determining that the first storage controller has failed, a mirrored first storage controller cache that is stored in a cache storage and that is a mirror of a first storage controller cache for the first storage controller from the cache storage to the second storage controller; and
cause the second storage controller to provide at least a first portion of the first storage communications along a second path between the first server and the first storage subsystem.

2. The system of claim 1, further comprising
a third storage controller that is coupled to the controller system, wherein the controller system is configured to:
determine that the third storage controller is configured to take over the first storage communications from the first storage controller;
provide, in response to determining that the first storage controller has failed, the first storage controller cache for the first storage controller to the third storage controller; and
cause the third storage controller to provide at least a second portion of the first storage communications along a third path between the first server and the first storage subsystem.

3. The system of claim 1, wherein the controller system is configured to:
determine that the second storage controller is configured to take over the first storage communications from the first storage controller in response to determining that a communication load handled by the second storage controller is less than a communication load handled by at least one third storage controller that is coupled to the controller system.

4. The system of claim 1, wherein the controller system is configured to:
receive a second storage controller configuration from a second server that is coupled to the second storage controller, wherein the controller system uses the second storage controller configuration to determine that the second storage controller is configured to take over the first storage communications from the first storage controller.

5. The system of claim 4, wherein the controller system is configured to:
store the second storage controller configuration on a storage device that is external to the controller system.

6. The system of claim 1, wherein the controller system is configured to:
determine that the second storage controller is configured to take over the first storage communications from the first storage controller prior to the determining that the first storage controller has failed.

7. The system of claim 1, wherein second storage controller is configured to:
provide at least one active virtual function for a second server to provide second storage communications along a third path between the second server and a second storage subsystem; and
hold at least one reserved virtual function prior to the failure of the first storage controller, wherein the causing the second storage controller to provide at least the first portion of the first storage communications along the second path between the first server and the first storage subsystem includes causing the second storage controller to:
provide the at least one reserved virtual function for the first server to provide the first storage communications along the second path between the first server and the first storage subsystem subsequent to the failure of the first storage controller.

8. An information handling system (IHS), comprising:
a processing system; and
a memory system that is coupled to the processing system and that includes instructions that, when executed by the processing system, cause the processing system to provide a controller engine that is configured to:
determine that a first storage controller that has provided first storage communications along a first path between a first server and a first storage subsystem has failed;
determine that a second storage controller is configured to take over the first storage communications from the first storage controller;
provide, in response to determining that the first storage controller has failed, a first storage controller cache for the first storage controller to the second storage controller; and
cause the second storage controller to provide at least a first portion of the first storage communications along a second path between the first server and the first storage subsystem, wherein second storage controller is configured to:
provide at least one active virtual function for a second server to provide second storage communications along a third path between the second server and a second storage subsystem; and
hold at least one reserved virtual function prior to the failure of the first storage controller, wherein the causing the second storage controller to provide at least the first portion of the first storage communications along the second path between the first server and the first storage subsystem includes causing the second storage controller to:
provide the at least one reserved virtual function for the first server to provide the first storage communications along the second path between the first server and the first storage subsystem subsequent to the failure of the first storage controller.

9. The IHS of claim 8, wherein the controller engine is configured to:
determine that a third storage controller is configured to take over the first storage communications from the first storage controller;
provide, in response to determining that the first storage controller has failed, the first storage controller cache for the first storage controller to the third storage controller; and cause the third storage controller to provide at least a second portion of the first storage communications along a fourth path between the first server and the first storage subsystem.

10. The IHS of claim 8, wherein the controller engine is configured to:
determine that the second storage controller is configured to take over the first storage communications from the first storage controller in response to determining that a communication load handled by the second storage controller is less than a communication load handled by at least one third storage controller.

11. The IHS of claim 8, wherein the controller engine is configured to:
receive a second storage controller configuration from the second server that is coupled to the second storage controller, wherein the controller engine uses the second storage controller configuration to determine that the second storage controller is configured to take over the first storage communications from the first storage controller.

12. The IHS of claim 8, wherein the controller engine is configured to:
determine that the second storage controller is configured to take over the first storage communications from the first storage controller prior to the determining that the first storage controller has failed.

13. A method for providing storage controller failover, comprising:
determining, by a controller system, that a first storage controller that has provided first storage communications along a first path between a first server and a first storage subsystem has failed;
determining, by the controller system using a second storage controller configuration received from a second server that is coupled to a second storage controller, that the second storage controller is configured to take over the first storage communications from the first storage controller;
providing, by the controller system in response to determining that the first storage controller has failed, a first storage controller cache for the first storage controller to the second storage controller; and
causing, by the controller system, the second storage controller to provide at least a first portion of the first storage communications along a second path between the first server and the first storage subsystem.

14. The method of claim 13, further comprising:
determining, by the controller system, that a third storage controller is configured to take over the first storage communications from the first storage controller;
providing, by the controller system in response to determining that the first storage controller has failed, the first storage controller cache for the first storage controller to the third storage controller; and
causing, by the controller system, the third storage controller to provide at least a second portion of the first storage communications along a third path between the first server and the first storage subsystem.

15. The method of claim 13, further comprising:
determining, by the controller system, that the second storage controller is configured to take over the first storage communications from the first storage controller in response to determining that a communication load handled by the second storage controller is less than a communication load handled by at least one third storage controller.

16. The method of claim 13, further comprising:
storing, by the controller system, the second storage controller configuration on a storage device that is external to the controller system.

17. The method of claim 13, further comprising:
determining, by the controller system, that the second storage controller is configured to take over the first storage communications from the first storage controller prior to the determining that the first storage controller has failed.

18. The method of claim 13, further comprising:
providing, by the second storage controller, at least one active virtual function for the second server to provide second storage communications along a third path between the second server and a second storage subsystem;
holding, by the second storage controller, at least one reserved virtual function prior to the failure of the first storage controller; and
providing, by the second storage controller, the at least one reserved virtual function for the first server to provide the first storage communications along the second path between the first server and the first storage subsystem subsequent to the failure of the first storage controller.

* * * * *